UNITED STATES PATENT OFFICE.

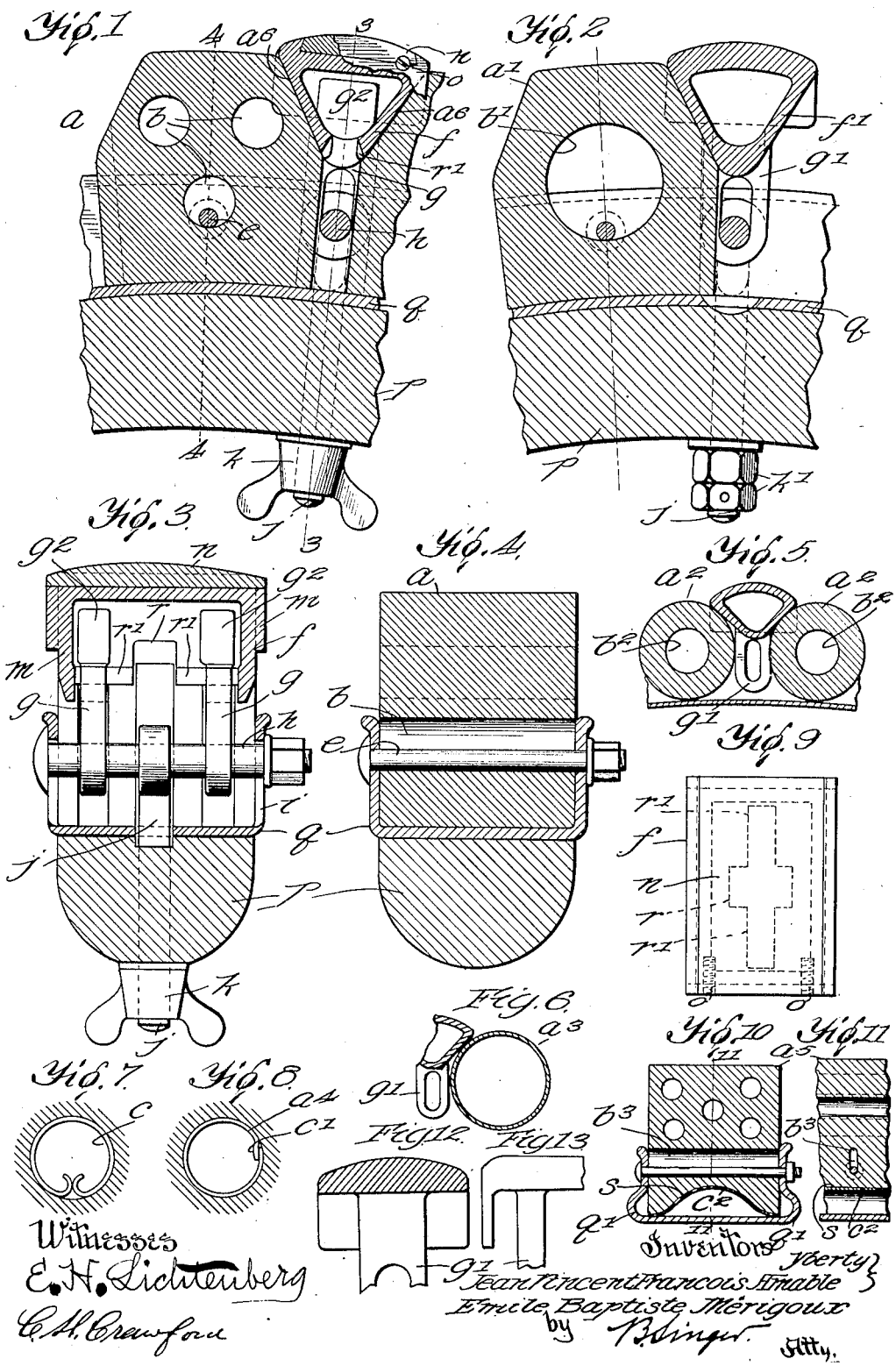

JEAN VINCENT FRANÇOIS AMABLE YBERTY AND EMILE BAPTISTE MÉRIGOUX, OF ROYAT-LES-BAINS, FRANCE.

TIRE FOR THE WHEELS OF ROAD-VEHICLES.

No. 888,214.            Specification of Letters Patent.           Patented May 19, 1908.

Application filed August 9, 1906. Serial No. 329,907.

*To all whom it may concern:*

Be it known that we, JEAN VINCENT FRANÇOIS AMABLE YBERTY and EMILE BAPTISTE MÉRIGOUX, citizens of the Republic of France, residing at Royat-les-Bains, France, have invented new and useful Improvements in Tires for the Wheels of Road-Vehicles of All Kinds, of which the following is a specification.

This invention relates to improvements in tires for use in connection with the wheels of road vehicles.

The invention consists in a composite tire wherein a continuous tread portion is formed by elements included in the construction and wherein a portion of the tread is composed of a plurality of elastic units disposed loosely upon the rim of the wheel and adapted to be held in place by blocks, preferably disposed at the abutting junctures of the units. The disposition of said units and blocks is such that the strain imposed upon the blocks is uniformly distributed on the units and to this end means are provided for loosely connecting said blocks with the wheel rim in such a manner as to permit inward radial movement of said blocks, when the units yield and prevent outward movement of said blocks beyond a predetermined point.

The invention has other objects and novel features which will be more fully described in connection with the accompanying drawing and will be more particularly pointed out and ascertained in and by the appended claims.

In the drawing: Figure 1, is a longitudinal sectional view of a portion of a tire embodying the features of our invention. Fig. 2, is a similar view showing a slightly modified form of the invention. Fig. 3, is a sectional view on line 3—3 of Fig. 1. Fig. 4, is a sectional view on line 4—4 of Fig. 1. Fig. 5, is a transverse sectional view of a modified form of my invention. Figs. 6, 7 and 8, show further modifications and transverse sections. Fig. 9, is a plan view of an improved spacing tread block. Fig. 10, is a transverse sectional view of a modified form of the invention. Fig. 11, is a sectional view on line 11—11 of Fig. 10. Fig. 12, is a sectional view and Fig. 13, is an elevation of an improved form of tread block.

Like characters of reference designate similar parts throughout the different figures of the drawing.

The elastic units shown are of different forms, that which is shown in Fig. 1 and designated by $a$ being substantially hexagonal and having three transversely disposed openings $b$ to increase its yielding action. The form of unit $a'$ shown in Fig. 2 is substantially the same as that shown in Fig. 1 except for the opening $b'$ which is enlarged, there being but one opening. In the form shown in Fig. 5 circular units are shown and the same are formed of rubber or other suitable yielding material as is the case in the constructions shown in Figs. 1 and 2. In Fig. 5 the units $a^2$ are provided with a single opening $b^2$. In Fig. 6 the unit $a^3$ is formed of any suitable yielding metal. In Fig. 7 a spring $c$ is provided to take up a portion of the compressive strain and in Fig. 8 a metal spring $c'$ is inserted in the opening of the unit $a^4$ to strengthen the same and said springs $c$ and $c'$ are bowed inwardly and over-lapped respectively so as to increase their yielding action.

Next referring to Figs. 1, 3, 4 and 9, which forms illustrate the preferred embodiment of the invention, $p$ designates the rim of the wheel which as shown is provided with a support $q$ shown as having a U-shaped or channel-like cross section. Said support $q$ is provided with openings $i$, preferably in the form of slots, through which support bolts $h$ project. The units $a$ are preferably spaced apart from each other when seated in the support $q$ and the openings $i$ are disposed in a manner to register with the spaces formed between said units as clearly shown in Fig. 1. Said units $a$ may engage the bolts $h$ but it will be understood that this is not essential as it is not necessary to rely wholly upon the bolts $h$ or to place any reliance thereon to maintain the units $a$ in position. In order to prevent displacement of the units $a$, in case parts hereinafter to be described become broken, means are provided preferably in the form of tire-bolts $e$ which as shown in Fig. 4 extend through openings in the support $q$ in which they are immovably secured. In order to afford engagement between the bolts $e$ and the units $a$ the openings $b$ in the latter are disposed in a manner to permit said bolts to extend therethrough. Desirably the openings b are increased in size with respect to the diameter of the bolts e so that no strain will be imposed upon the latter when the units are compressed by their load as it is not the function of the bolts e to sustain any stress. In order to fully relieve bolts e from any strain the latter are disposed in such a manner as to engage only the lower portions of the openings b so as to permit the units a to freely expand and be contracted without in any way straining said bolts.

A continuous tread portion is provided for the tire and is formed, partly by the units a and partly by blocks f f' which engage the units a and close the peripheral spaces formed therebetween, in constructions where the units are spaced apart from each other. Preferably the blocks f are constructed in such a manner as to equalize the distribution of strain on said units and in the preferred form this object is attained by making the blocks f wedge-shaped and providing units a with correspondingly formed wedge-shaped engaging portions $a^6$. Said wedge-shaped blocks engage and hold said units in place and in the preferred form said blocks extend slightly beyond the periphery of the units so that the major portion of wear is taken up by said blocks. If desired said blocks may be made in the form shown in Figs. 12 and 13 wherein the lower face of the block is flat and rests upon the peripheral surface of the units when the same are not provided with wedge-shaped engaging portions. In order to provide effective means for preventing lateral displacement of the units the blocks f are provided with laterally disposed unit engaging portions m. Where it is desirable that the tread of the wheel should consist as far as possible of rubber or like material of a high tractive efficiency the blocks f may be recessed and a separate tread plate n may be disposed in said recess so that it can easily be renewed when worn. Said tread plate n may be if desired formed of rubber or it may be of metal in which latter case its outer surface would be roughened or corrugated. A convenient manner of securing said plates n is shown in Figs. 1 and 9 wherein the recess in the block f is dove-tailed and wherein keys in the form of screws o are provided to prevent said plates from being displaced longitudinally.

Means are provided for holding said blocks f in engagement with said units a and said means serve to permit inward movement of said blocks when the units yield under the imposition of pressure on said blocks and prevent outward movement of said blocks beyond a predetermined point. As shown said blocks f are positively connected with the rim p and to this end radially disposed rim bolts j are provided which extend through said rim and support q where they are connected with support bolts h. Links g are provided for said blocks f and preferably said links are slotted to receive the support bolts h. The rim bolts j are provided with nuts k which may be either in the form shown in Figs. 1 or 2 and which permit of adjustment of said bolts.

It will be seen by reference to Fig. 3 that the improved connection shown wholly sustains the strain resulting from expansion of the units a and the maintenance of the blocks f in engagement therewith as the bolts h do not engage the outer ends of the slots i. These slots i are primarily for the purpose of permitting adjustment of the bolts h so that when the units a become worn the bolts j may be taken up to adjust the blocks f inwardly and such adjustment also permits of the use of units of different depths on a single rim. When the blocks f are forced inwardly the slots in the links g permit inward movement of said blocks without in any way affecting the bolts j and when said blocks are restored to their normal position the looped ends of the links g engage the bolts h and prevent outward radial movement of the blocks f beyond a predetermined point. Said links g, as shown in Figs. 1 and 3, are removably secured to blocks f and in Figs. 2, 5, 6, 12 and 13 the links g' are formed integral with said blocks. In either construction we prefer to place the bolts j between the links as shown in Fig. 3. One manner of removably securing the links g to the blocks f is shown in Figs. 1, 3 and 9 wherein the blocks f are hollow and are provided with a longitudinally disposed slot having a relatively enlarged entering portion r and relatively reduced retaining portions r'. The links g are provided with heads $g^2$ which are adapted to be inserted through said entering portion r and moved laterally in the blocks f abreast of the retaining portions r' whereby they are prevented from being withdrawn from the blocks f.

In Figs. 10 and 11 the base portions of the units are formed with a concave recess s and the supports are provided with lateral channels q' so that when the units a are subjected to an excessive pressure they are permitted to flatten and expand laterally into said channels. If desired springs $c^2$ may be interposed between said units and their supports.

We claim:—

1. In combination, a wheel rim, a tire support therefor of U shaped cross section provided with bolt holes, a tire composed of a plurality of distinct elastic units spaced apart from each other and provided with openings, tire bolts extending through said openings in said units and said support, said support being provided with slots, support bolts extending through said slots and between said units, wedge shaped blocks interposed between said units and forming therewith a continuous tread, block links loosely secured to said blocks and having slotted ends connected with said support bolts, and rim bolts connecting said support bolts with said rim.

2. In combination, a wheel rim, a tire support therefor of U shaped cross section provided with bolt holes, a tire composed of a plurality of distinct elastic units spaced apart from each other and provided with openings and wedge shaped engaging portions, tire bolts extending through said openings in said units and said support, said support being provided with slots, support bolts extending through said slots between said units, hollow wedge shaped blocks engaging said wedge shaped portions and forming with said units a continuous tread, said blocks being slotted to provide entering and retaining portions, headed block links adapted to be inserted in said entering portion and moved laterally therein to effect engagement between the heads thereof and said retaining portions, said block links having slotted ends connected with support bolts, and rim bolts connecting said support bolts with said rim.

3. In combination, a wheel rim, a tire support therefor provided with bolt slots, a tire composed of a plurality of distinct elastic units spaced apart from each other and provided with openings and wedge shaped engaging portions, support bolts extending through said slots between said units, hollow wedge shaped blocks engaging said wedge shaped portions and forming with said units a continuous tread, said blocks being slotted to provide entering and retaining portions, headed block links adapted to be inserted in said entering portion and moved laterally therein to effect engagement between said heads and retaining portions, said block links having slotted ends connected with said support bolts, and rim bolts connecting said support bolts with said rim.

4. In combination, a wheel rim, a tire support therefor provided with bolt slots, a tire composed of a plurality of distinct elastic units spaced apart from each other, wedge blocks forming with said units a continuous tread, block links connected with said blocks and provided with slotted ends, support bolts extending through the slotted ends of said links and through the slots of said support and between said units, and rim bolts connecting with said support bolts and said rim.

5. In combination, a wheel rim, a tire support therefor, a tire composed of a plurality of distinct elastic units spaced apart from each other, wedge blocks forming with said units a continuous tread, block links connected with said blocks and loosely connected with said support, and means for connecting said block links with said rim.

In testimony whereof we have affixed our names to this specification in the presence of two subscribing witnesses.

JEAN VINCENT FRANÇOIS
AMABLE YBERTY.
EMILE BAPTISTE MÉRIGOUX.

Witnesses:
PAUL CHEVARY,
PROSPER GUYOT.